No. 662,492. Patented Nov. 27, 1900.
C. P. MINGST.
CUTTING TOOL.
(Application filed Aug. 2, 1900.)
(No Model.)
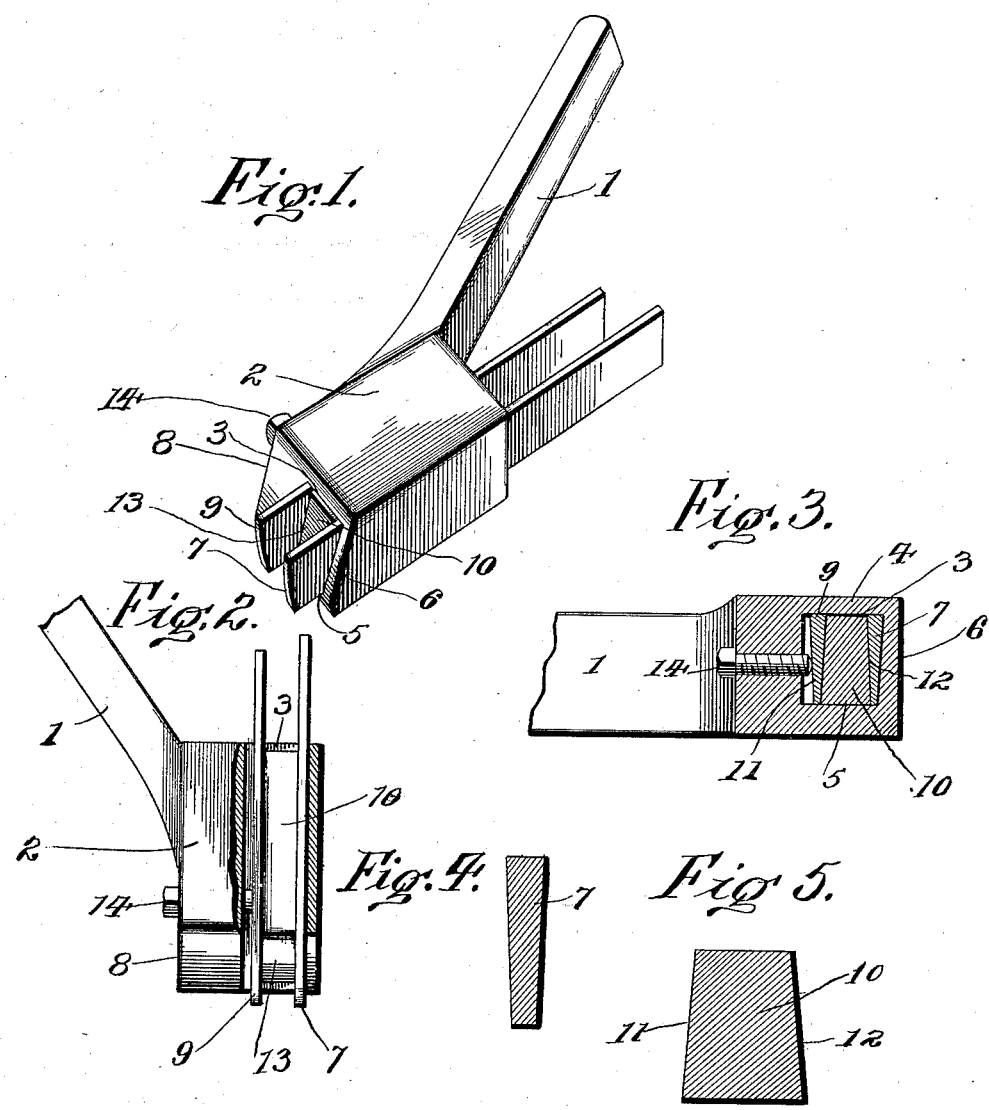
Witnesses
E. W. Hart
Sarah V. Lockwood
Inventor
Charles P. Mingst
By Frank C. Goe
Attorney
THE NORRIS PETERS CO., PHOTO-LITHO., WASHINGTON, D. C.

UNITED STATES PATENT OFFICE.

CHARLES P. MINGST, OF EVANSVILLE, INDIANA.

CUTTING-TOOL.

SPECIFICATION forming part of Letters Patent No. 662,492, dated November 27, 1900.

Application filed August 2, 1900. Serial No. 25,633. (No model.)

*To all whom it may concern:*

Be it known that I, CHARLES P. MINGST, a citizen of the United States, residing at Evansville, in the county of Vanderburg and State of Indiana, have invented certain new and useful Improvements in Cutting-Tools; and I do hereby declare the following to be a full, clear, and exact description of the invention, such as will enable others skilled in the art to which it appertains to make and use the same.

My invention relates to cutting-tools for use on lathes and other metal-working machines.

One object of the present invention is the provision of a tool-holder for securing a plurality of cutting-tools, suitably spaced apart, whereby rings of the same width can be rapidly cut off from the work one after another, thereby obviating the loss of time and labor now spent in adjusting the cutting-tool and measuring every time a duplicate ring is to be cut.

Another object of the invention is the provision of a novel form of holder adapted to hold a plurality of cutting tools or blades spaced apart any desired distance and held in a removable manner, so that they can be taken out and replaced by other blades with rapidity and ease.

Another object is the provision in a cutting-tool of improved means for securing the tool or tools and insuring their proper position and rigid holding.

Having the foregoing objects in view, the invention consists of a cutting-tool comprising certain improved features and novel combinations of parts appearing more in detail hereinafter.

In the accompanying drawings, Figure 1 is a perspective view; Fig. 2, a plan view with the top of the holder removed; Fig. 3, a cross-section; Fig. 4, a cross-section of one of the blades, and Fig. 5 a cross-section of the spacing-block.

Numeral 1 designates the shank, and 2 the head of the holder. The head 2 has an opening 3 extending longitudinally thereof, which is wider at its top than at its bottom 5. The side 6 of the opening slants from the top 4 to the bottom 5, at an angle the same as the side of the cutting-tool blade 7 in order that the said blade will be held perfectly perpendicular when it lies against said side. I may state here that the blades are broader at their tops than at their bottoms—that is, they taper, in order that suitable clearance will be had when the blade is cutting into the work.

The numeral 8 designates the front end of the head, which slants in the manner shown in order to give the blade the best possible chance for a deep cut, with a minimum portion of the blade extending from the head of the holder. In the holder can be placed one or more additional blades 9, according to the nature of the work. In the present instance I have shown one additional blade. Between the blades is located a removable spacing-block 10, which has its sides 11 and 12 converging upwardly toward each other at suitable angles to snugly lie against the inclined sides of the blades between which it is located, so that the said blades will be held perfectly perpendicular and parallel. The upward end of the spacing-block is cut away at 13 on the same incline or at the same angle as the end 8 of the head. To clamp the blades and spacing-block in the head of the holder, I employ one or more clamping-screws 14. In the present instance I have shown but one clamping-screw; but in some instances it is desirable to employ two screws in order to properly secure the blades and block.

With a tool such as I have described after it has once been decided what the width of the ring to be cut shall be a spacing-block of that width is placed between the blades and they are clamped with the screw. Having once been adjusted, after a ring has been cut from the stock being turned subsequent rings can be cut, which will be exact duplicates of the first ring. I thus provide means for cutting off duplicate rings without necessitating the expenditure of any time and labor in making adjustments after the tool has once been set.

It is obvious that more than two blades could be secured in the holder if desired. It is also clear that if a spacing-block of the exact width is not at hand the extra width between the blades can be had by filling out with strips of metal placed against the spacing-block used.

Having thus described my invention, what I claim as new, and desire to secure by Letters Patent, is—

1. The combination with a cutting-tool holder having a head provided with an opening, of a spacing-block in said opening and adapted for lateral movement therein, cutting-blades located in the opening and on opposite sides of the spacing-block, and a clamping device for urging the blades and block laterally against one side of the opening and holding them there.

2. The combination with a cutting-tool holder having a head provided with an opening which has one side slanting from top to bottom, of cutting-blades having slanting sides, a spacing-block located between said blades in the opening and having slanting sides, and a clamping-screw for securing said blades and blocks.

3. The herein-described tool, comprising a holder having an opening which has one side slanting, cutting-blades tapered from their top to their bottom edges, one of which is located against the slanting side aforesaid, a spacing-block interposed between said blades and having its sides converging upwardly at the same angle as the sides of the blades against which it abuts, and a clamping-screw disposed substantially at right angles to said blades and block and adapted to secure them in the holder, said holder and block having their front ends slanting or inclined.

In testimony whereof I affix my signature in presence of two witnesses.

CHARLES P. MINGST.

Witnesses:
FRANK T. GILLES,
FRED W. GOEDEK.